No. 880,620. PATENTED MAR. 3, 1908.
S. N. BIRDSALL.
VEHICLE GEAR.
APPLICATION FILED OCT. 9, 1907.
2 SHEETS—SHEET 1.
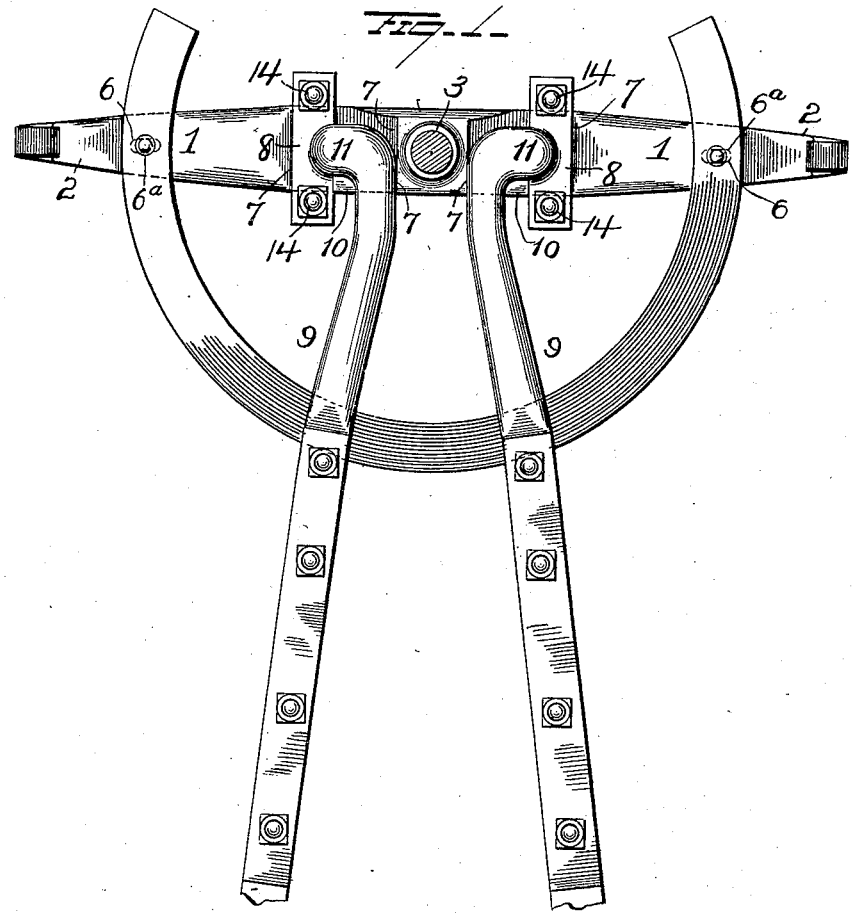
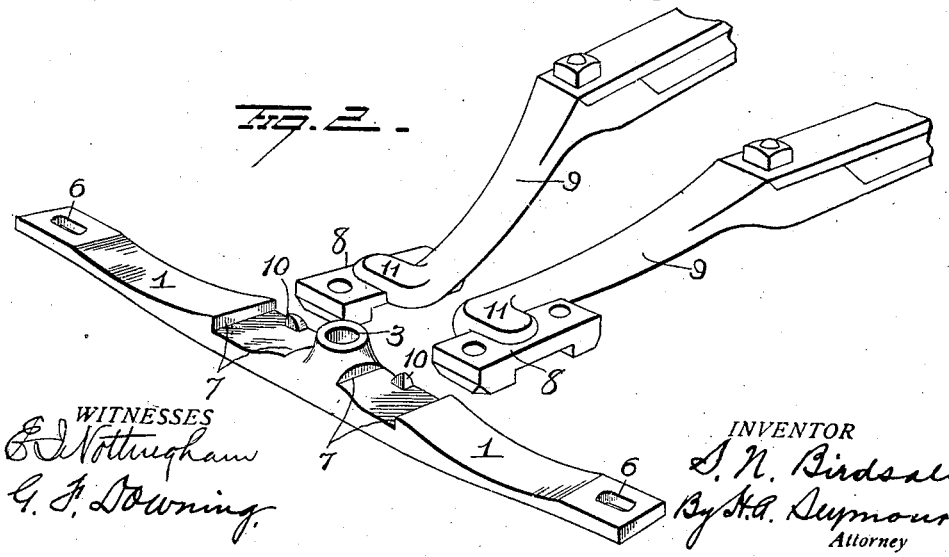
WITNESSES
E. J. Nottingham
G. F. Downing
INVENTOR
S. N. Birdsall
By H. G. Seymour
Attorney No. 880,620. PATENTED MAR. 3, 1908.
S. N. BIRDSALL.
VEHICLE GEAR.
APPLICATION FILED OCT. 9, 1907.
2 SHEETS—SHEET 2.
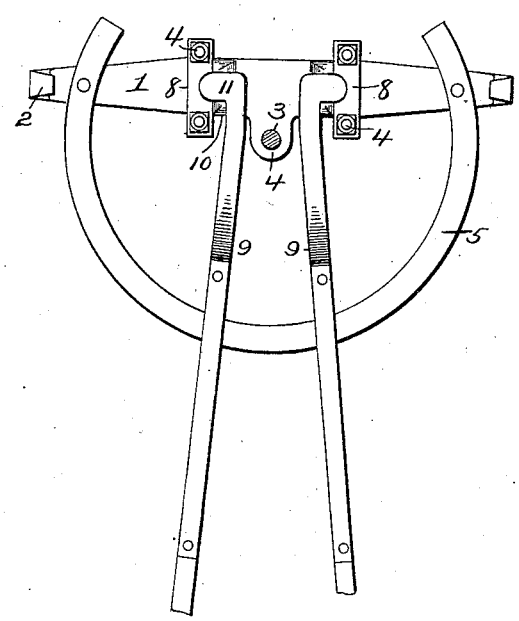

UNITED STATES PATENT OFFICE.

STEPHEN N. BIRDSALL, OF DAYTON, OHIO, ASSIGNOR TO ISAAC CORNWELL, OF NORTHUMBERLAND, PENNSYLVANIA.

VEHICLE-GEAR.

No. 880,620.        Specification of Letters Patent.        Patented March 3, 1908.

Application filed October 9, 1907. Serial No. 396,621.

*To all whom it may concern:*

Be it known that I, STEPHEN N. BIRDSALL, of Dayton, in the county of Montgomery and State of Ohio, have invented certain new and useful Improvements in Vehicle-Gears; and I do hereby declare the following to be a full, clear, and exact description of the invention, such as will enable others skilled in the art to which it appertains to make and use the same.

My invention relates to an improvement in vehicle gear, the object being to provide simple and effective means for securing the reach irons to the head block plate, whereby all lateral strains are removed from the clips connecting the parts.

With this end in view my invention consists in the parts and combination of parts as will be more fully described and pointed out in the claims.

In the accompanying drawings Figure 1 is a bottom plan view showing the parts connected, the head block plate having the king bolt in its center. Fig. 2 is a view of the parts detached, and Fig. 3 is a view similar to Fig. 1 showing the king bolt opening in a part projecting rearwardly from the head block plate.

1 represents a head block plate secured to the lower face of the head block 2 in the usual manner.

The plate 1 may be provided with a central king bolt opening 3 as shown in Fig. 1, or it may be provided with a rearward extension 4 having the king bolt opening 3 therein as shown in Fig. 3, the fifth wheel members, the upper one 5 of which is shown, being of course, curved in arcs concentric with the king bolt opening.

The head block plate, is provided at its ends with holes 6 through which the bolts 6ᵃ pass to secure the fifth wheel member 5 to the head block, and which assist in securing the head block plate 1 to the head block.

The plate 1 is provided on its lower face with the transverse shoulders 7, which latter are on opposite sides of the king bolt opening and equal distance therefrom, and form lateral supports for the ends 8 of the reach irons 9. The plate 1 is also provided on its lower face intermediate the shoulders 7 and the king bolt opening, with the lugs 10, the latter being located adjacent to the rear edge of the plate and form shoulders which also take up lateral strains, and also direct pulling strains.

The reach irons 9 are bent at right angles at their forward ends, as shown at 11, and terminate in the ends 8 which as shown, are parallel with the reach irons and are of a length sufficient to project on both the front and rear sides of the head block plate.

The upper faces of the ends 8 of the reach irons are recessed to receive the head block plate 1, the end walls of said recesses bearing against the front and rear sides of the head block plate.

When the reach irons are in place, or connected up to the head block and plate, the outer side walls of the ends 8 of the reach irons, rest against the shoulders 7, while the right angle portions 11 thereof rest against the front faces of the lugs 10, and these bearings together with the shoulder formed by recessing the upper faces of the ends 8, practically take all the strains, lateral as well as direct, from the U-shaped clips 14 which latter embrace the head block and head block plate 1 and pass through the holes in the ends 8 of the reach iron, and secure these parts together.

By making the reach irons separate from the head block plate, I simplify the construction and cost of manufacture, and by providing the two parts with engaging shoulders, I take practically all the strains from the clips which secure the reach irons, head block plate and head block together.

It is evident that many slight changes might be resorted to without departing from the spirit and scope of my invention and hence I would have it understood that I do not wish to confine myself to the exact construction shown and described, but, Having fully described my invention what I claim as new and desire to secure by Letters-Patent, is:

1. The combination in a vehicle gear, of a head block plate having a king bolt opening and provided on its lower face with transverse shoulders located on opposite sides of the king bolt opening, lugs depending from said plate and spaced from said shoulders and said king bolt opening, and reach irons bent outwardly approximately at right angles at their front ends and terminating in end sections which project in front and rear of the head block plate, the said end sections having holes for the securing clips, said end sections being confined between said shoulders and lugs and the outwardly bent portions of the reach irons disposed in front of said lugs.

2. The combination with a head block plate having a king bolt opening, and provided on its lower face on opposite sides of the king bolt opening with transverse shoulders, and with lugs spaced from said shoulders and the king bolt opening, of reach irons bent approximately at right angles at their front ends and bearing against said lugs, said bent portions of the reach irons terminating in end sections adapted to span the head block plate, the said end sections resting between the shoulders and lugs, with the right angle bends in the reach irons in front of the lugs, and clips securing the reach iron to the head block.

3. The combination with a head block plate having a king bolt opening, and provided on its lower face, on opposite sides of the king bolt opening with transverse shoulders, and with lugs spaced from the shoulders and king bolt opening, of reach irons bent approximately at right angles at their front ends and terminating in end sections recessed on their upper faces to receive the head block plate, the said end sections resting between the shoulders and the lugs on the plate, with the right angle bends in the reach irons in front of the lugs, and clips securing the parts together.

In testimony whereof, I have signed this specification in the presence of two subscribing witnesses.

STEPHEN N. BIRDSALL.

Witnesses:
  L. G. LONG,
  J. B. SMITH.